(12) United States Patent
Nemazie et al.

(10) Patent No.: US 9,319,387 B2
(45) Date of Patent: *Apr. 19, 2016

(54) SECURE SPIN TORQUE TRANSFER MAGNETIC RANDOM ACCESS MEMORY (STTMRAM)

(71) Applicants: Siamack Nemazie, Los Altos Hills, CA (US); Ngon Van Le, Fremont, CA (US)

(72) Inventors: Siamack Nemazie, Los Altos Hills, CA (US); Ngon Van Le, Fremont, CA (US)

(73) Assignee: Avalanche Technology, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,881

(22) Filed: Sep. 28, 2015

(65) Prior Publication Data

US 2016/0021073 A1 Jan. 21, 2016

Related U.S. Application Data

(60) Continuation of application No. 14/542,533, filed on Nov. 14, 2014, which is a division of application No. 13/619,114, filed on Sep. 14, 2012, now Pat. No. 8,954,759.

(51) Int. Cl.
*H04L 9/08* (2006.01)
*H04L 29/06* (2006.01)
*G11C 11/16* (2006.01)
*H04W 12/04* (2009.01)

(52) U.S. Cl.
CPC ........ *H04L 63/0428* (2013.01); *G11C 11/1695* (2013.01); *H04L 63/083* (2013.01); *H04W 12/04* (2013.01)

(58) Field of Classification Search
CPC ............ G06F 21/10; G06F 2221/2107; G06F 3/0679; G06F 11/1008
See application file for complete search history.

(56) References Cited

U.S. PATENT DOCUMENTS

| 8,301,694 B2 * | 10/2012 | Ittah ..................... G06F 12/0888 709/203 |
| 2011/0154059 A1 * | 6/2011 | Durham ................. G06F 21/72 713/190 |

* cited by examiner

*Primary Examiner* — Josnel Jeudy
(74) *Attorney, Agent, or Firm* — Maryam Imam; Bing K. Yen

(57) ABSTRACT

A magnetic memory device includes a main memory made of magnetic memory, the main memory and further includes a parameter area used to store parameters used to authenticate data. Further, the magnetic memory device has parameter memory that maintains a protected zone used to store protected zone parameters, and an authentication zone used to store authentication parameters, the protection zone parameters and the authentication parameters being associated with the data that requires authentication. Upon modification of any of the parameters stored in the parameter memory by a user, a corresponding location of the parameter area of the main memory is also modified.

2 Claims, 5 Drawing Sheets

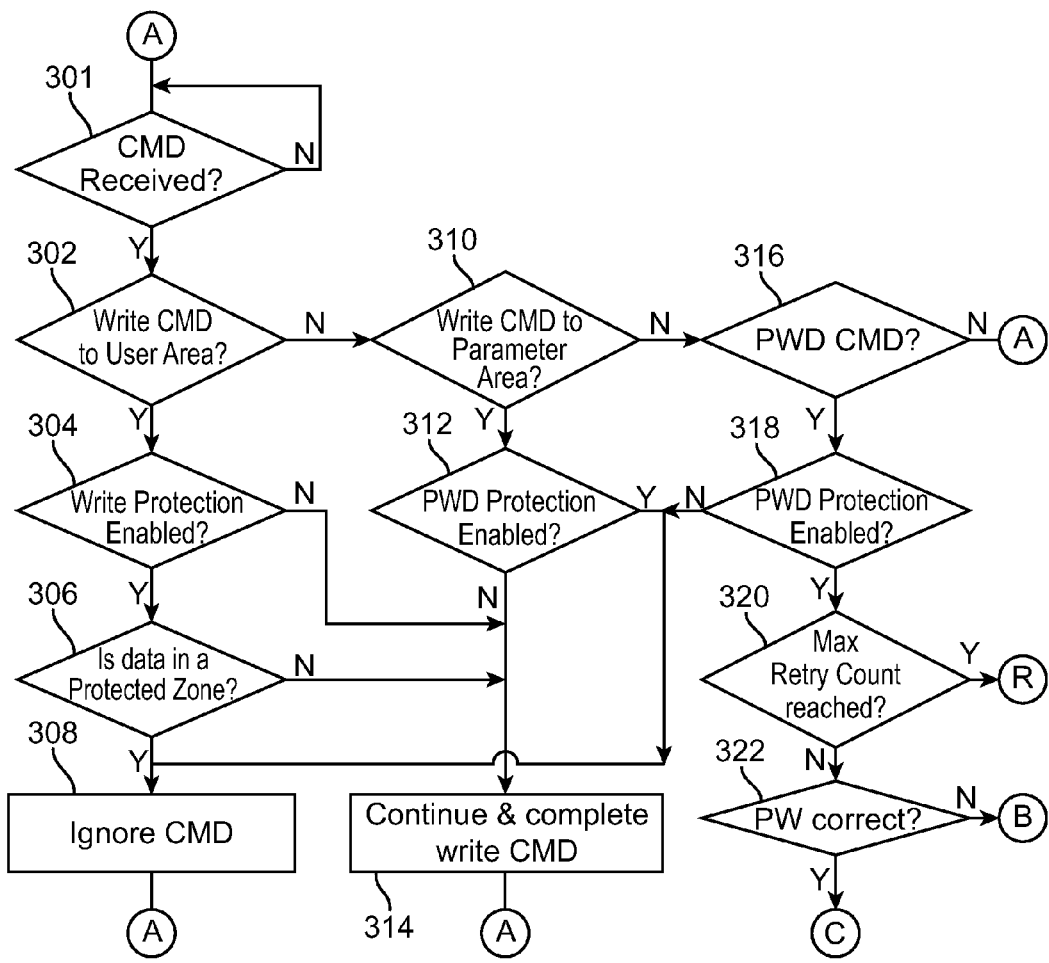
FIG. 3a
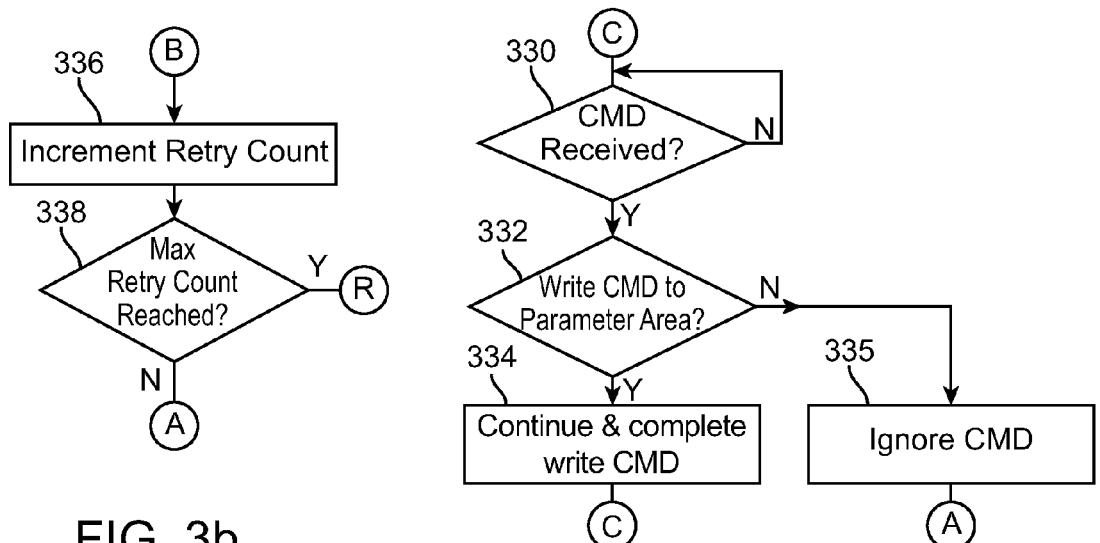
FIG. 3b
FIG. 3c

SECURE SPIN TORQUE TRANSFER MAGNETIC RANDOM ACCESS MEMORY (STTMRAM)

CROSS REFERENCE TO RELATED APPLICATIONS

This application is a continuation of U.S. patent application Ser. No. 14/542,533, filed on Nov. 14, 2014, by Siamack Nemazie, and entitled "SECURE SPIN TORQUE TRANSFER MAGNETIC RANDOM ACCESS MEMORY (STTMRAM)", which is a divisional of U.S. patent application Ser. No. 13/619,114, filed on Sep. 14, 2012, by Siamack Nemazie, and entitled "SECURE SPIN TORQUE TRANSFER MAGNETIC RANDOM ACCESS MEMORY (STTMRAM)".

BACKGROUND OF THE INVENTION

1. Field of the Invention

The invention relates generally to a secure spin torque transfer magnetic random access memory (STTMRAM) and particularly to STTMRAM with protected areas and use thereof.

2. Description of the Prior Art

Microprocessor-based systems commonly employ volatile random access memory such as static random access memory (SRAM) or dynamic random access memory (DRAM), and non-volatile random access memory such as NOR Flash. They also use non-volatile block access memory such as NAND Flash for mass storage applications. Use of volatile random access memory includes dynamic storage of programs and data. Flash has typically much slower access time than RAM but offers non-volatility. The non-volatile random access memory NOR Flash use includes storing code (including BIOS, pre boot or boot code), and system configuration parameters, such code or parameters are changed very infrequently. If the code is altered in a malicious manner, it can be used to introduce viruses. Non-volatile random access memory, such as NOR Flash, includes features to enable or disable programming in an effort to prevent unauthorized programming of certain protected areas, such as those including sensitive or confidential information. However, currently, there is no fast, reliable, and secure manner for using the protected areas that are designated for information that requires authentication prior to accessing thereof.

Thus, there is a need for microprocessor-based systems using memory and protected areas to securely, reliably, and speedily access such protected areas.

SUMMARY OF THE INVENTION

Briefly, a magnetic memory device includes a main memory made of magnetic memory, the main memory and further includes a parameter area used to store parameters used to authenticate data. Further, the magnetic memory device has parameter memory that maintains a protected zone used to store protected zone parameters, and an authentication zone used to store authentication parameters, the protection zone parameters and the authentication parameters being associated with the data that requires authentication. Upon modification of any of the parameters stored in the parameter memory by a user, a corresponding location of the parameter area of the main memory is also modified.

These and other objects and advantages of the invention will no doubt become apparent to those skilled in the art after having read the following detailed description of the various embodiments illustrated in the several figures of the drawing.

IN THE DRAWINGS

FIGS. 3a, 3b, 3c show a flow chart of the steps performed during a write operation to the main memory 110, in accordance with a method of the invention.

Figure 5:
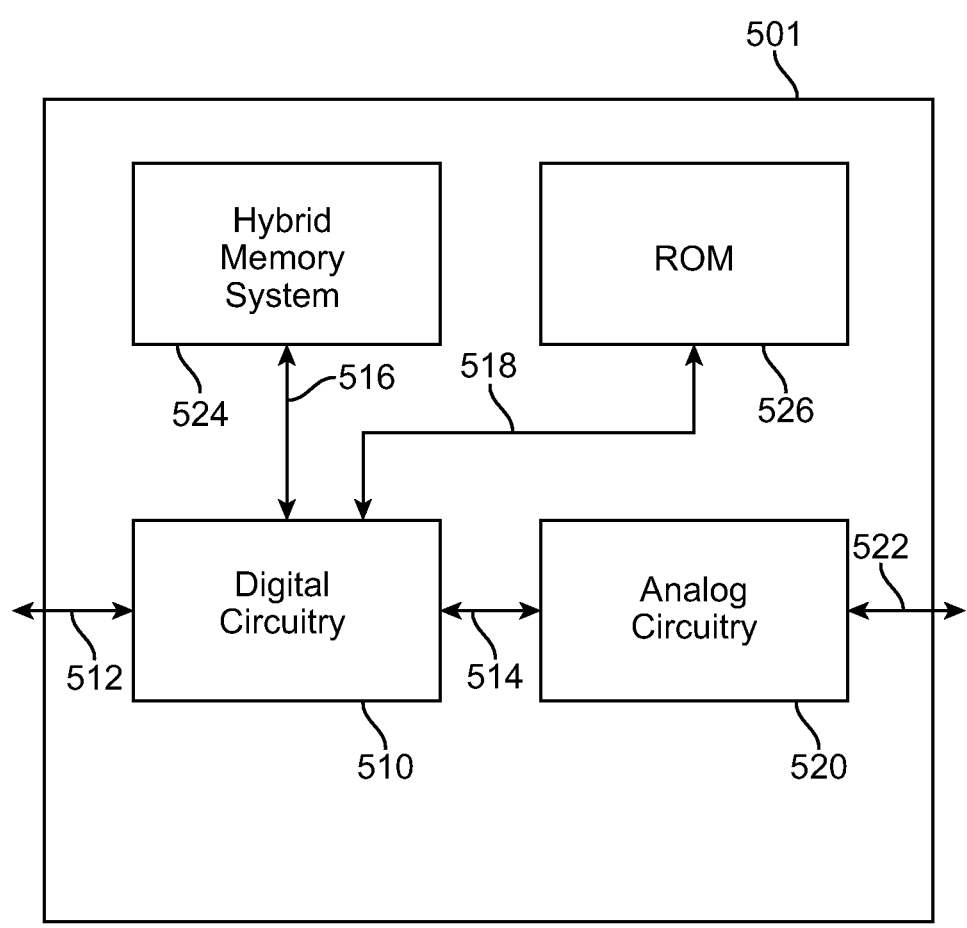

FIG. 5 shows a block diagram of an apparatus 501 incorporating a hybrid memory system 524, which, in some embodiments, includes a combination of magnetic memory, analogous to the magnetic memory device 100 or 200, and volatile memory (such as static random access memory (SRAM) or dynamic random access memory (DRAM)), and in other embodiments includes magnetic memory, in its entirety.

DETAILED DESCRIPTION OF THE VARIOUS EMBODIMENTS

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention. It should be noted that the figures discussed herein are not drawn to scale and thicknesses of lines are not indicative of actual sizes.

In an embodiment of the invention, a magnetic memory device includes a main memory made of magnetic memory, the main memory and further includes a parameter area used to store parameters used to authenticate access. Further, the magnetic memory device has parameter memory that maintains a protected areas used to store protected zone parameters, and an authentication zone used to store authentication parameters, the protection zone parameters and the authentication parameters being associated with the access that requires authentication. Upon modification of any of the parameters stored in the parameter memory by a user, a corresponding location of the parameter area of the main memory is also modified.

In an exemplary embodiment, the main memory is made of Magnetic Random Access Memory (MRAM), such as Spin Torque Transfer Magnetic Random Access Memory (STTMRAM), with an access time that is comparable with RAM as well as being non-volatile. Accordingly, the need for non-volatile random access memory such as NOR Flash in system applications is advantageously eliminated. Also, unauthorized write access to the protected zone (or area) is advantageously prevented thereby increasing the security features of the magnetic memory device. Additionally moving parameters, code and data from a relatively slow non-volatile memory such as NOR Flash to a relatively fast volatile RAM is avoided, thus increasing security, and performance of the system.

The main memory in the non-volatile memory SSTMRAM includes one or more protected zones. The protected zones can be dynamically configured to enable or disable write operations to the protected zone.

In one embodiment of the invention, the parameters associated with configuration of the magnetic memory device, and operation of memory including parameters associated with the protected zones (parameters) are stored in the main memory and during power up or when an initialization command is issued after power are read from main memory and loaded into volatile memory (latch, register, RAM) for control of memory operations. When the parameters are updated, both the main memory and corresponding volatile memory are updated.

In another embodiment, some parameters are updated including parameters associated with protected zones and they are password-protected, the password being part of parameters (authentication parameters).

In yet another embodiment, the password is encrypted with a session key, the session key being part of parameters (crypto parameters).

Figure 1:
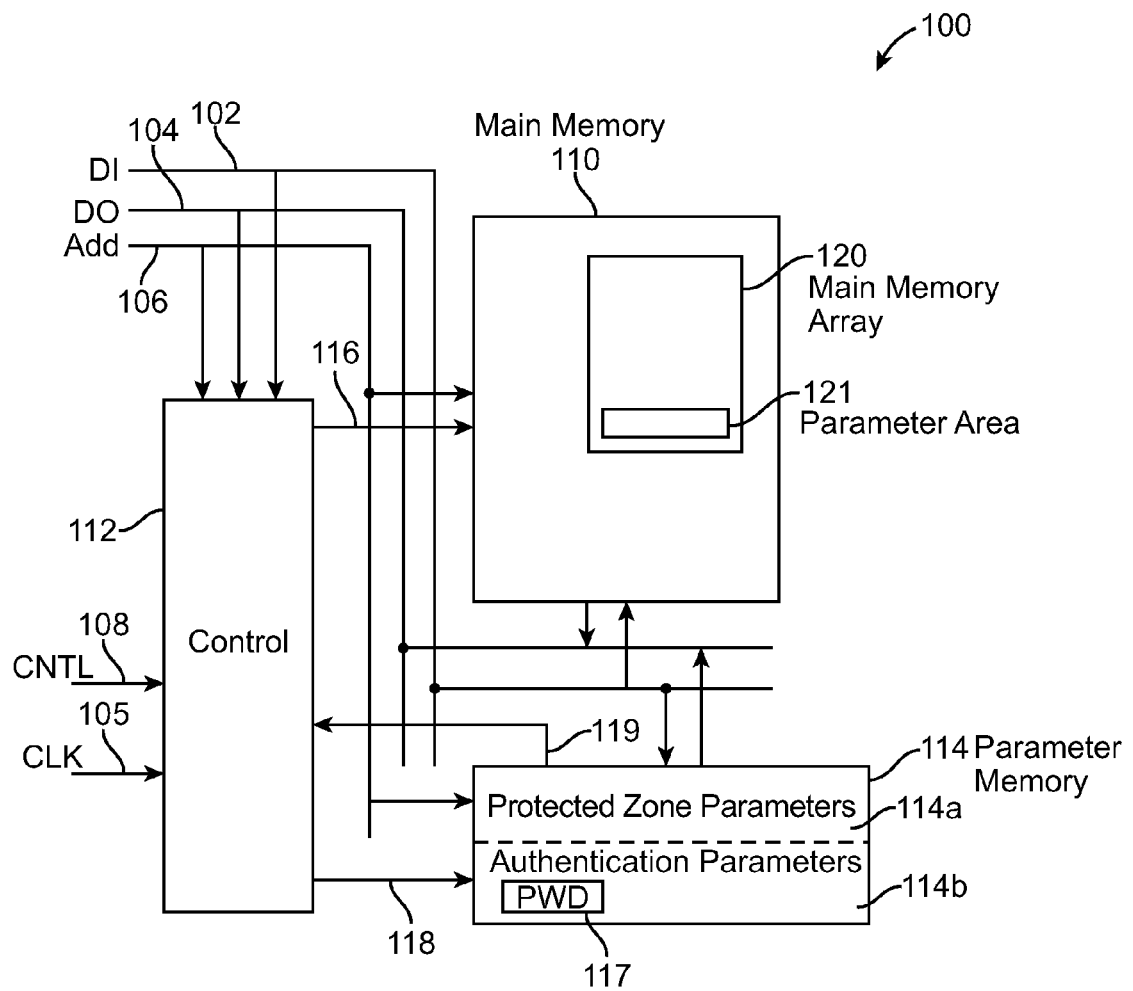
FIG. 1 shows a block diagram of one embodiment of the invention.

Referring now to FIG. 1, a block diagram of magnetic memory device 100, is shown, in accordance with an embodiment of the invention. The device 100 is shown to include a magnetic random access main memory 110, a parameter memory 114, and a control circuit 112. The main memory 110 is shown to include a main memory array 120 organized as an array of rows and columns of magnetic memory cells, rows making up one or more pages. The main memory array 120 is shown to include a parameter area 121. The main memory array 120 is a designated part of the main memory 110 and within the array 120 is the designated area, i.e. the parameter area 121.

The parameter memory 114 is shown to include protected zone parameters 114a and a authentication parameters 114b, the latter of which is shown to include a password 113. The parameters 114a and 114b each are areas of the parameters memory 114 collectively comprise a "protected area" within the parameters memory 114 that are associated with the access that requires authentication. As will be evident, the password 117 is a password or code that is stored in the parameter memory 114 for use in authenticating the access to the information stored in the parameter area 121. Thus, the parameter memory 114 maintains a protected area used to store protected zone parameters, and an authentication parameters area used to store authentication parameters, the protection zone parameters and the authentication parameters being associated with the access that requires authentication.

The control circuit 112 is shown to receive control signals ("CNTL") 108 and a clock ("CLK") 105. The control circuit 112 uses the CNTL 108 and the CLK 105 to direct accessing of the main memory 110 and the parameter memory 114 and is thus coupled to the main memory 110, through input data ("DI") 102, output data ("DO") 104, address bus ("Add"), and control signals 116, and is also coupled to the parameter memory 114 through the DI 102, the DO 104, the Add 106, parameters 119, and control signals 118.

The main memory 110 may be any kind of magnetic memory, such as but not limited to spin torque transfer magnetic random access memory (STTMRAM). In one embodiment, the parameter memory 114 is any kind of volatile memory such as a latch, register, register file, or SRAM.

The input to the memory device 100 interface includes a clock, CLK 105, an address bus Add 106, a data in bus DI 102, data out bus DO 104 and a control CNTL 108. Control CNTL 108 comprising of a chip enable; CE*108a, and a write enable; WE* 108b. All commands are defined by states of control signals CE* 108a, and WE* 108b at the rising edge of the clock CLK 105. In this embodiment the memory device 100 is a synchronous memory with separate input and output buses other embodiments with asynchronous memory, synchronous double data rate (DDR) and/or with common input/output bus fall within scope of the invention.

In this embodiment the parameters associated configuration, and operation of memory including parameters associated with the protected zones and authentication are stored in the main memory array 120 in a parameter area 121 and are read from parameter area 121 in main memory 110 during power up or when an initialization command is issued after power up and loaded into parameter memory 114. In this embodiment a parameter in parameter memory 114 has a corresponding one in parameter area 121. If a parameter in parameter memory 114 is updated by the user the corresponding location in parameter area 121 is also updated.

In an alternative embodiment the parameter memory 114 is a hybrid and consists of a volatile memory for protected zone parameters 114a and a non-volatile memory for authentication parameters where the non-volatile parameter memory is made with same magnetic memory cell as the main memory 110. In this alternative embodiment a parameter in volatile parameter memory have a corresponding one in the non-volatile parameter area 121, and during power up or when an initialization command is issued after power are read from non-volatile parameter area and loaded into volatile parameter memory. If a parameter in volatile parameter memory is updated by the user the corresponding location in non-volatile parameter memory is also updated.

The address bus ("Add") 106 is shown coupled to the control circuit 112, the main memory 110, and the parameter memory 114, and provide an address identifying a location in the main memory 110 and or parameter memory 114 to which a write or a read operation is performed.

The control circuit 112 is shown to receive address bus 106, data in bus DI 102, (optionally) data out bus 104, the clock CLK 105 and CNTL 108. The control circuit 110 is also shown to receive parameters 119 from parameter memory 114, and to generate control signals 116 to main memory 110 and control signals 118 to parameter memory 114 for controlling operations. The parameters 119 is used to identify if the addressed data is in a protected zone and provide authentication parameters.

The data in bus DI 102 is shown coupled to both main memory 110 and parameter memory 114. The data out bus DO 104 is also coupled to both main memory 110 and parameter memory 114.

Figure 2A:
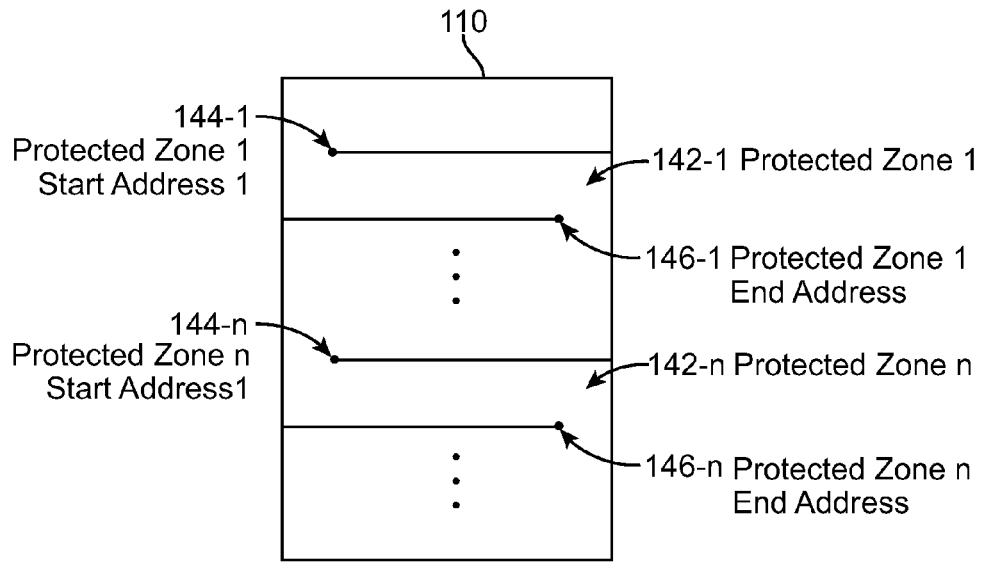
FIG. 2a shows a configuration of the main memory 110, in accordance with another embodiment of the invention for defining the protected zones.

The main memory 110 includes one more protected zones. FIG. 2a shows a configuration of the main memory 110, in accordance with an embodiment of the invention for defining the protected zones. In FIG. 2a the main memory 110 is shown to include n protected zone. Each protected zone is a contiguous address space from a start address to an end address. The start and end address are burst aligned (aligned to an address that is divisible by burst size). Protected zone 1 142-1 is the contiguous address space between protected zone 1 start address 144-1 and protected zone 1 end address 146-1. Protected zone n 142-n is the contiguous address space between protected zone n start address 144-n and protected zone 'n' end address 146-n, with 'n' being an integer value. The corresponding protected zone start address and end address are stored in parameter memory.

Figure 2B:
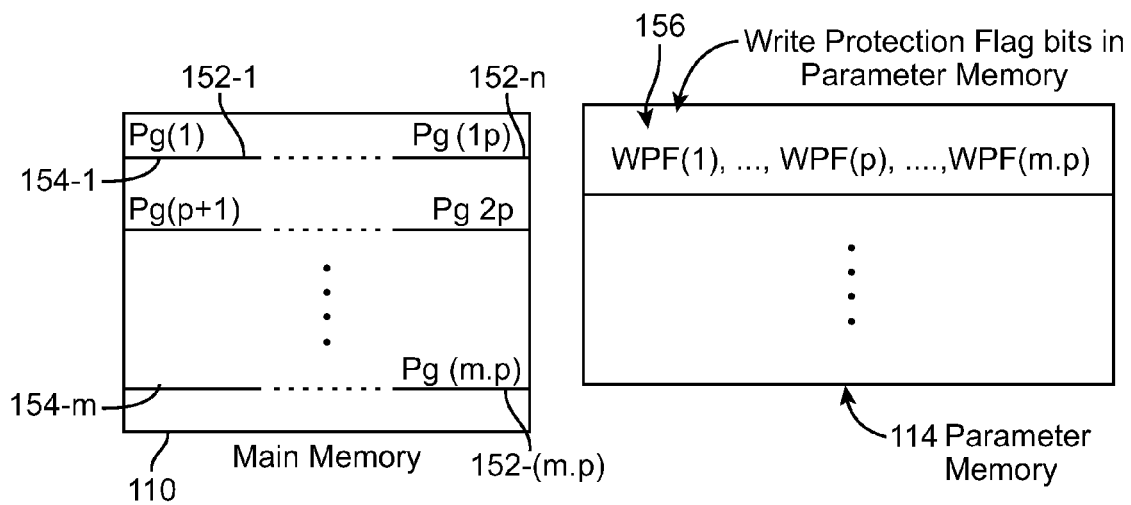
FIG. 2b shows a configuration of the main memory 110 and the parameter memory 114, in accordance with another embodiment of the invention for defining protected zones.

FIG. 2b shows a configuration of the main memory 110 and the parameter memory 114, in accordance with another embodiment of the invention for defining protected zones. The memory unit 110 is shown to include m rows 154-1 through 154-*m*, and each row comprising p pages for a total of t (t=m.p) pages, each page being a protected zone. A Write Protection Flag (WPF) bit associated with each page WPF(1), ... WPF(p), ..., WPF(m.p) collectively 156 in parameter memory is used to write protect the protected page.

In another embodiment the protected zone includes a plurality of pages, and the flag corresponds to the group. For example protected zone 1 consisted of page 1 and 2, protected zone 2 consists of pages 3 and 4 and so forth.

The write operation of memory of present invention will be described using the flow diagram of FIGS. 3a, 3b, and 3c.

At step 301 check for command (CMD) reception, and remain in step 301 until a CMD is received. When at step 301 a command is received the process moves to step 302 and at step 302 checks if the CMD is a write to the user area. If at step 302 the CMD is a write to user area the process moves to step 304 and checks if write protection (a parameter) is enabled. If at step 304 it is determined that write protection is not enabled, the process moves to step 314 and completes the write command. If at step 304 it is determined that write protection is enabled the process moves to step 306. At step 306 the process checks to this if the address (or addresses in case of a burst) of the data to be written is in a protected zone. If at step 306 it is determined that the write is to a protected area the process moves to step 308 where the CMD is ignored (command completed without write) and the moves back to step 301. If at step 306 it is determined that the address of data to be written is not in a protected zone then the process moves to step 314 and completes the write command. If at step 302 it is determined that the write command is not to the user area the process moves to step 310. At step 310 the process checks if the CMD is a write to the parameter area. If at step 310 it is determined that the CMD is a write to parameter area the process moves to step 312 and checks if password (PWD) protection (a parameter in parameter memory) is enabled. If at step 312 it is determined that PWD protection is not enabled, the process moves to step 314 and completes the write command, else the process moves to step 308 and ignores the CMD. If at step 310 it is determined that the CMD is not a write to parameter area the process moves to step 316 and checks if the command is a PWD CMD. If at step 316 it is determined that the CMD is a PWD command the process moves to step 318 and checks if password (PWD) protection (a parameter in parameter memory) is enabled. If at step 318 it is determined that PWD protection is not enabled, the process moves to step 308 where the CMD is ignored (command completed without write), else the process moves to step 320. At step 320 the process checks if the maximum number of retries for providing correct password is exceeded. If the maximum number of retries is not exceeded the process moves to step 322 and checks if the password provided with the PWD CMD is correct.

If at step 322 it is determined that the password provided along with PWD CMD is correct the process moves to step 330 else the process moves to step 336. At step 330 the process waits for a new command. When a new command is received the process moves to step 332 and checks if the new CMD is a write to the parameter area. If at step 332 it is determined that the CMD is a write to parameter area the process moves to step 334 and completes the write command and writes data in both the parameter memory and parameter area of the main memory, and then moves to step 330. If at step 332 it is determined that the CMD is not a write to parameter area the process moves to step 335 where the CMD is ignored (command completed without write) and the process moves back to step 301. If at step 322 it is determined that the password provided along with PWD command is incorrect, the process moves step 336 and increments the retry count and saves the retry count in parameter memory and parameter area of the main memory, and moves to step 338. At step 338 the process checks if the maximum number of retries for providing correct password is exceeded. If the maximum number of retries is not exceeded the process moves back to step 301 else move to step R for recovery. In one embodiment at step R the command is ignored and the process moves back to step 301. Other embodiments for step R, the recovery, can be envisioned and generally are variations to the general scope of the present invention.

As mentioned before if a parameter in volatile parameter memory is updated by the user the corresponding location in parameter area 121 of main memory 110 (or in alternative embodiment in non-volatile parameter memory) is also updated.

In the embodiment 100, the password provided along with the PWD CMD to verify and authenticate the user and allow subsequent writes to parameter area, is in the clear and can be observed by monitoring the memory 100 interface. Similarly the Set PWD CMD is in clear and can be observed by monitoring the memory 100 interface. It is desirable to encrypt the PWD with a key, such as master key or a session key that is dynamic (collectively referred to as key).

Figure 4:
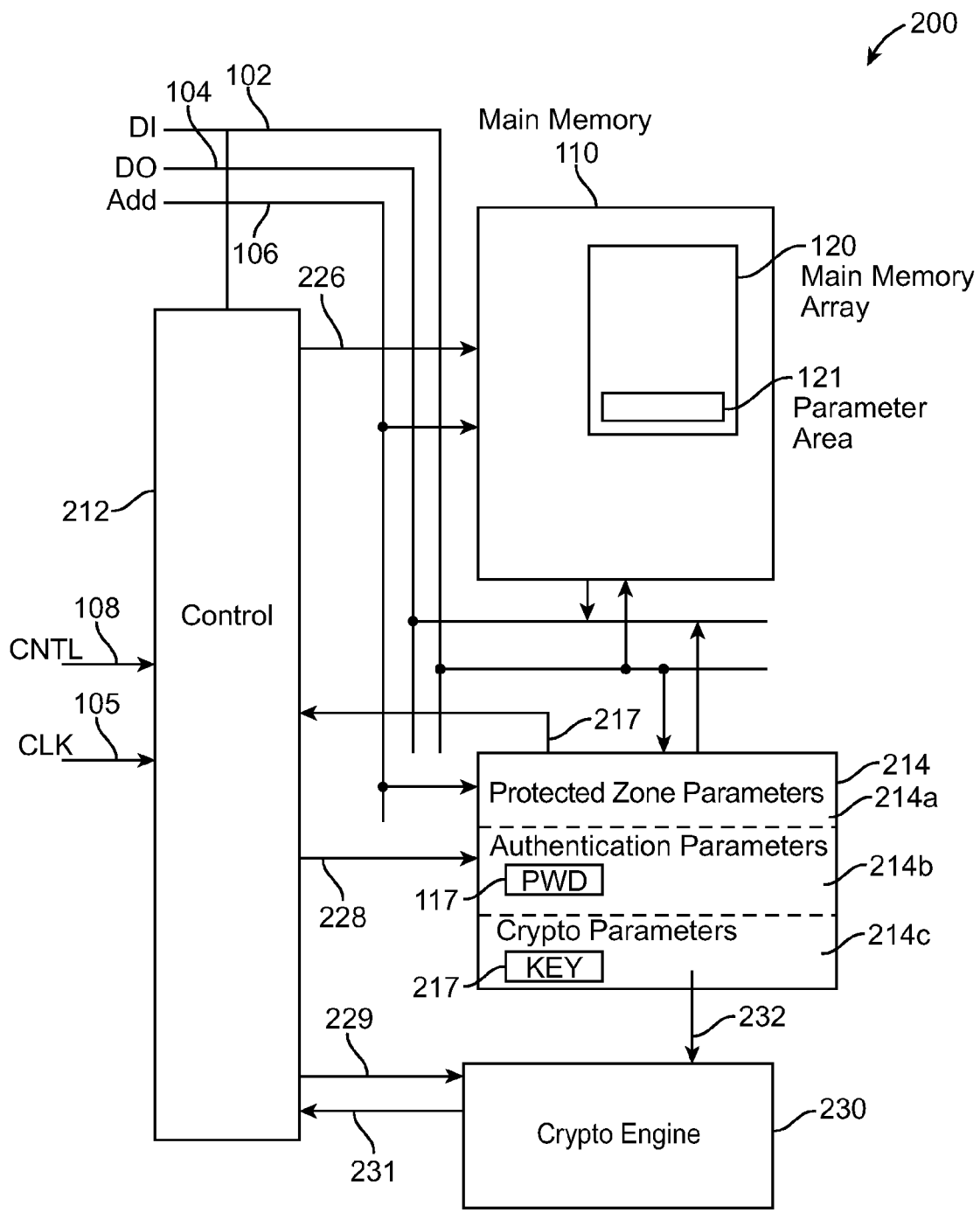
FIG. 4 shows a block diagram of magnetic memory device 200, in accordance with another embodiment of the invention.

FIG. 4 shows a block diagram of magnetic memory device 200, in accordance with another embodiment of the invention. The device 200 is analogous to the device 100 with the addition of crypto engine 230 and crypto parameters in parameter memory 214c the crypto parameters including key 217 for decryption. Similar to the other parameters, the crypto parameters are initialized during power up or when an initialization command is issued after power up. The crypto parameters are provided via bus 232 to crypto engine. The control 212 provides command and control to crypto engine via bus 229 and receives results and status from the crypto engine via bus 231. In the embodiment 200, the password provided along with the PWD CMD to verify and authenticate the user and allow subsequent writes to parameter area, is encrypted. In response to PWD CMD the control 212 generates the command and control to crypto engine 230 via bus 229 to decrypt the encrypted password, and in response the crypto engine 230 provides status indicating completion of decryption along with result of decryption via bus 231 to control circuit 212. The control circuit 212 performs comparison of decrypted result with the password used for authentication to determine if the password is correct.

FIG. 5 shows a block diagram of an apparatus 501 incorporating a hybrid memory system 524, which, in some embodiments, includes a combination of magnetic memory, analogous to the magnetic memory device 100 or 200, and volatile memory (such as static random access memory (SRAM) or dynamic random access memory (DRAM)), and in other embodiments includes magnetic memory, in its entirety. The apparatus 501, which is understood as being an exemplary application with many others being contemplated, is shown to include a digital circuitry 510, comprising a microprocessor (microprocessor optionally including instruction cache (I-cache) and data cache (D-cache) coupled to the system 524, and (optionally) a ROM 526 and an analog circuitry 520 (comprising power on reset generator, low power voltage detect, and a voltage regulator). Additionally the analog circuitry 520 transmits and receives analog data 522 and converts the analog data to digital form for use by the digital circuitry 510 through the digital data 514. The ROM 526 is yet another form of memory used to store data during manufacturing of the apparatus 501 and whose contents are read through the signals 518. The system 524 communicates data through the signals 516 to and from the digital circuitry 510. The apparatus 501 transmits and receives information through the interface 512, and the analog data 522. The system 501 optionally includes a non-volatile block access memory such as NAND Flash (not shown) coupled to digital circuit 510 (not shown) for mass storage applications. In some embodiments, the digital circuitry 510 is a microprocessor although other digital circuitry in addition thereto or in replacement thereof is contemplated. The system 501 does not require non-volatile random access NOR Flash as the magnetic memory in the hybrid memory system 524 provides the functionality.

The apparatus 501 allows direct access to the magnetic memory of the hybrid memory 524, and allows processing of microprocessor instructions from the magnetic memory.

Further, the digital circuitry 510, ROM 526, and the analog circuitry 520 may be formed on a single integrated circuit (ICs) or span multiple ICs or partially formed on one or more ICs and partially formed externally to the ICs.

In alternative embodiments, the digital circuitry 510, ROM 526, the analog circuitry 520 and the hybrid memory 524 may be formed on a single integrated circuit (ICs) or span multiple ICs or partially formed on one or more ICs and partially formed externally to the ICs.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A mobile device comprising:

wireless device for connection to wireless networks;

a first memory system including more than one type of memory, a type of memory of the first memory system including non-volatile memory with a parameter area, the parameter area configured to store parameters used to authenticate access to certain areas of the non-volatile memory; and a first memory located externally to the non-volatile memory and configured to maintain a first area used to store protected zone parameters, the first memory further configured to maintain a second area used to store authentication parameters including an authentication password (PWD), the first memory further configured to maintain a third area used to store crypto parameters, the crypto parameters including a key used to decrypt the encrypted PWD, the encrypted PWD employed to authorize access to the protected area by decryption of the encrypted PWD using the key and a result of comparison of the decrypted PWD with the authentication PWD, wherein upon a user updating a parameter of the first memory, a corresponding parameter of the parameter area is also updated.

2. The mobile device of claim 1, wherein the first memory system is hybrid.

* * * * *